(12) United States Patent
Stacy et al.

(10) Patent No.: US 6,222,294 B1
(45) Date of Patent: Apr. 24, 2001

(54) COMBINATIONS OF SOLENOIDS AND MOTORS

(75) Inventors: Timothy D. Stacy, Naugatuck; Albert Palmero, Middlebury, both of CT (US)

(73) Assignee: Tri-Tech, Inc., Waterbury, CT (US)

( * ) Notice: Subject to any disclaimer, the term of this patent is extended or adjusted under 35 U.S.C. 154(b) by 0 days.

(21) Appl. No.: 09/462,240

(22) PCT Filed: Jun. 29, 1998

(86) PCT No.: PCT/US98/13489

§ 371 Date: Mar. 20, 2000

§ 102(e) Date: Mar. 20, 2000

(87) PCT Pub. No.: WO99/01922

PCT Pub. Date: Jan. 14, 1999

Related U.S. Application Data

(60) Provisional application No. 60/051,494, filed on Jul. 1, 1997.

(51) Int. Cl.$^7$ ............................ H02K 33/00; H02K 33/02; H02K 33/12
(52) U.S. Cl. ............................... 310/112; 310/12; 310/14; 310/23; 290/38 A; 335/266; 335/267
(58) Field of Search ............................... 310/112, 12, 14, 310/48, 66, 96, 99, 273, 23, 24; 335/266, 267, 268; 290/38 A, 38 R

(56) References Cited

U.S. PATENT DOCUMENTS

| | | | |
|---|---|---|---|
| 2,860,266 | * 11/1958 | Schrader | 310/112 |
| 4,197,488 | * 4/1980 | Kant | 310/12 |
| 4,985,637 | * 1/1991 | Isozumi | 290/48 |
| 5,052,235 | * 10/1991 | Isozumi | 74/7 E |

* cited by examiner

Primary Examiner—Nestor Ramirez
Assistant Examiner—Burt Mullins
(74) Attorney, Agent, or Firm—John H. Crozier

(57) ABSTRACT

In a preferred embodiment, an actuator, including: a shaft (34); a solenoid (24), having a coil (40) and a core (42), disposed at a first selected position on the shaft, with the core being fixedly attached to the shaft such that energization of the coil will cause the shaft to move axially; and a rotary motor (22), having a stator (30) and a rotor (32), disposed at a selected second position on the shaft, with the shaft passing through the rotor, an external surface of the shaft and an internal surface of the rotor having complementary engaging surfaces such that rotation of the rotor will cause rotation of the shaft and axial motion of the shaft will be isolated from the rotor.

6 Claims, 2 Drawing Sheets

COMBINATIONS OF SOLENOIDS AND MOTORS

CROSS-REFERENCE TO RELATED APPLICATIONS

The present application claims the benefit of the filing dates of U.S. Provisional Application No. 60/051,494, filed Jul. 1, 1997, and co-pending PCT application No. PCT/US98/13489, filed Jun. 29, 1998.

DESCRIPTION

1. Technical Field

The present invention relates to solenoids and motors generally and, more particularly, but not by way of limitation, to novel combinations of solenoids and motors which can provide: (1) linear and rotary motion, (2) an adjustable stroke solenoid, or (3) a linearly adjustable solenoid.

2. Background Art

Rotary and linear actuators are employed in a variety of applications such as instrumentation and manufacturing, for example. Often, such actuators must combine linear and rotary motion and sometimes it is desirable that the stroke of a linear actuator be selectively adjustable. Many known devices of these types are relatively complex and expensive to manufacture.

Accordingly, it is a principal object of the invention to provide combinations of solenoids and motors which can provide: (1) linear and rotary motion, (2) an adjustable stroke solenoid, or (3) a linearly adjustable solenoid.

It is a further object of the invention to provide such combinations of solenoids and motors which are relatively simple and inexpensive to manufacture.

Other objects of the present invention, as well as particular features, elements, and advantages thereof, will be elucidated in, or be apparent from, the following description and the accompanying drawing figures.

DISCLOSURE OF INVENTION

The present invention achieves the above objects, among others, by providing, in a preferred embodiment, an actuator, comprising: a shaft; a solenoid, having a coil and a core, disposed at a first selected position on said shaft, with said core being fixedly attached to said shaft such that energization of said coil will cause said shaft to move axially; and a rotary motor, having a stator and a rotor, disposed at a second selected position on said said shaft, with said shaft passing through said rotor, an external surface of said shaft and an internal surface of said rotor having complementarily engaging surfaces such that rotation of said rotor will cause rotation of said shaft and axial motion of said shaft will be isolated from said rotor.

BRIEF DESCRIPTION OF DRAWINGS

Understanding of the present invention and the various aspects thereof will be facilitated by reference to the accompanying drawing figures, submitted for purposes of illustration only and not intended to define the scope of the invention, on which.

BEST MODE FOR CARRYING OUT THE INVENTION

Figure 1:
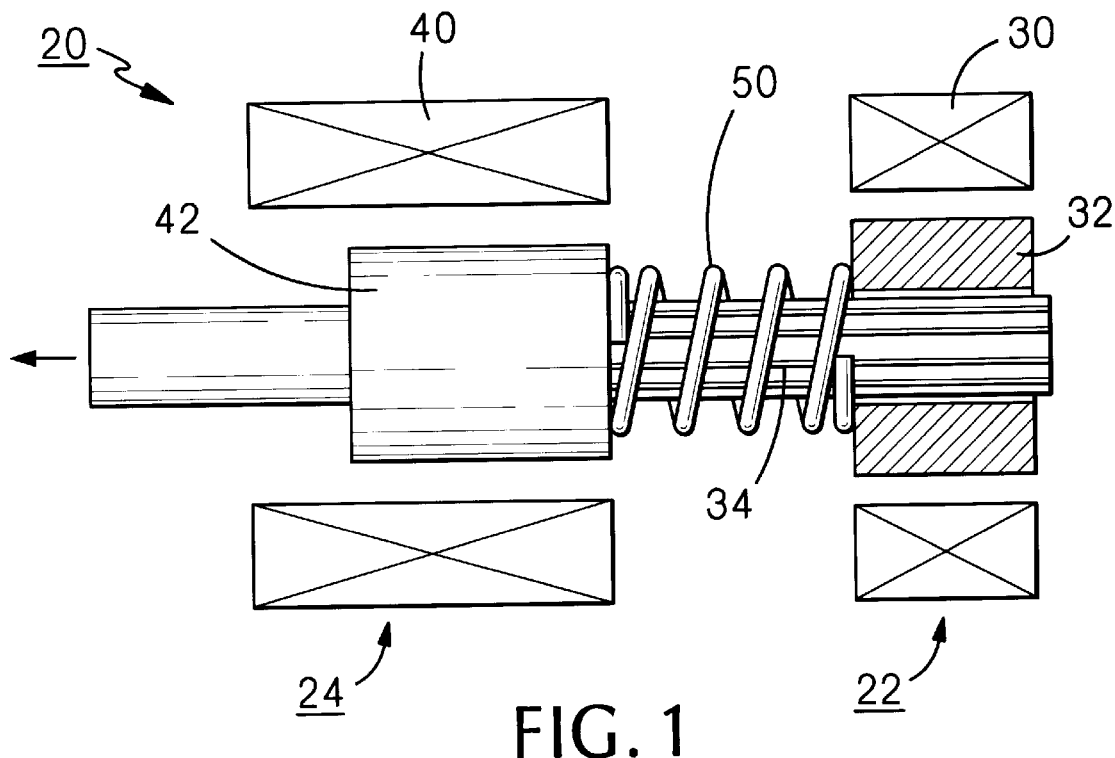
FIG. 1 is a side elevational view, partially in cross-section, of a combination rotary motor and solenoid which obtains linear and rotary motion.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates a combination rotary motor and solenoid, the combination generally indicated by the reference numeral 20, with the rotary motor generally indicated by the reference numeral 22 and the solenoid generally indicated by the reference numeral 24. Motor 22 includes a stator 30 surrounding and electromagnetically engaging a rotor 32, the rotor having passing centrally therethrough a shaft 34, the portion of the shaft passing through the rotor being splined. The interior channel of rotor 32 through which shaft 34 passes has a shape complementary to that of the splined portion of the shaft, such that rotation of the rotor will cause the shaft to rotate. Solenoid 24 includes a coil 40 surrounding and electromagnetically engaging a core 42, core being fixedly attached to shaft 34 which extends axially from the core.

In one mode of operation, solenoid 24 is energized to cause shaft 34 to move to the left in the direction of the arrow shown on FIG. 1, with the splined portion of shaft 34 isolating the linear motion from rotor 32. It may be assumed that this movement causes engagement with a workpiece (not shown). Then, motor 22 is energized to cause rotational movement of shaft 34. In another mode of operation, motor 22 is energized prior to energizing solenoid 24. In yet another mode of operation, both motor 22 and solenoid 24 are energized simultaneously. In any mode, spring 50 is provided to return shaft 34 to its neutral position shown on FIG. 1 when solenoid 24 is de-energized.

Figure 2:
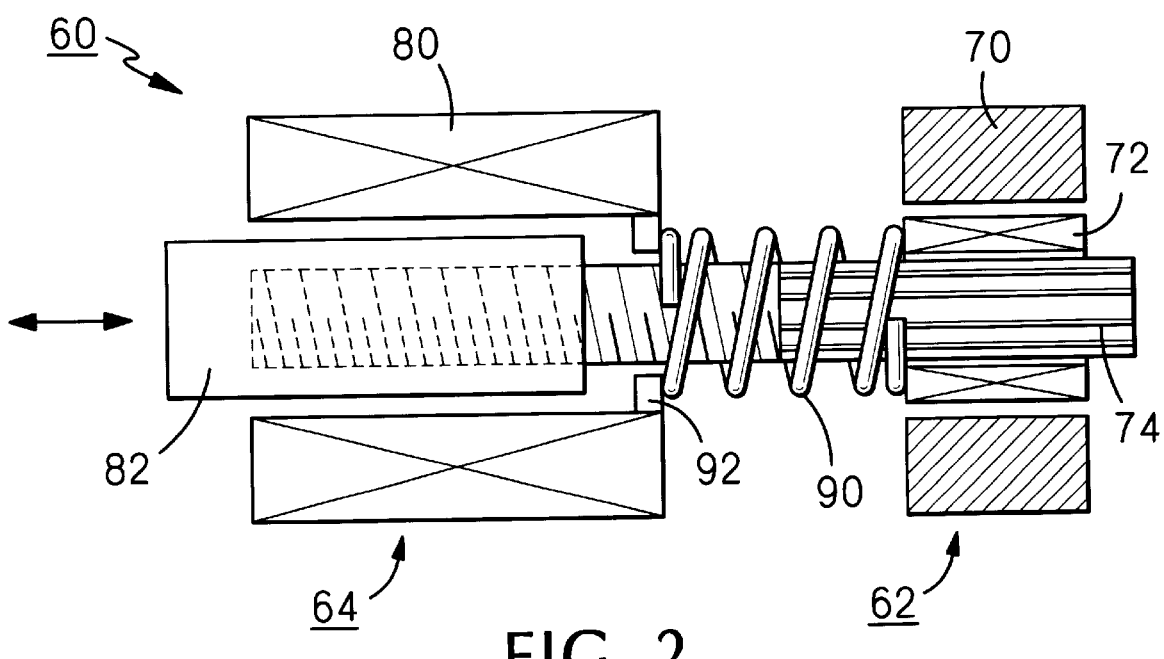
FIG. 2 is a side elevational view, partially in cross-section, of a combination linear actuator and solenoid to become an adjustable stroke solenoid.

FIG. 2 illustrates a combination linear actuator and solenoid, generally indicated by the reference numeral 60, the motor generally indicated by the reference numeral 62, and the solenoid generally indicated by the reference numeral 64. Motor 62 includes a stator 70 surrounding and electromagnetically therethrough a shaft 74, the portion of the shaft passing through the rotor being splined. The interior channel of rotor 72 through which shaft 74 passes has a shape complementary to that of the splined portion of the shaft, such that rotation of the rotor will cause the shaft to rotate. Solenoid 64 includes a coil 80 surrounding and electromagnetically engaging a core 82. An important feature of this embodiment is that core 82 includes a threaded axial bore which telescoping engages a threaded portion of shaft 74.

In operation, motor 62 is energized to rotate in a selected direction to move core 82 outwardly or inwardly of coil 80, thus adjusting the linear stroke of core 82. A spring 90 is provided to return core 82 to its neutral position upon de-energization of solenoid 64 and one or more stops 92 may be provided to limit the degree of axial adjustment of core 82. Either pushing or pulling force may be provided by core 82, as is indicated by the double-headed arrow on FIG. 2.

Figure 3:
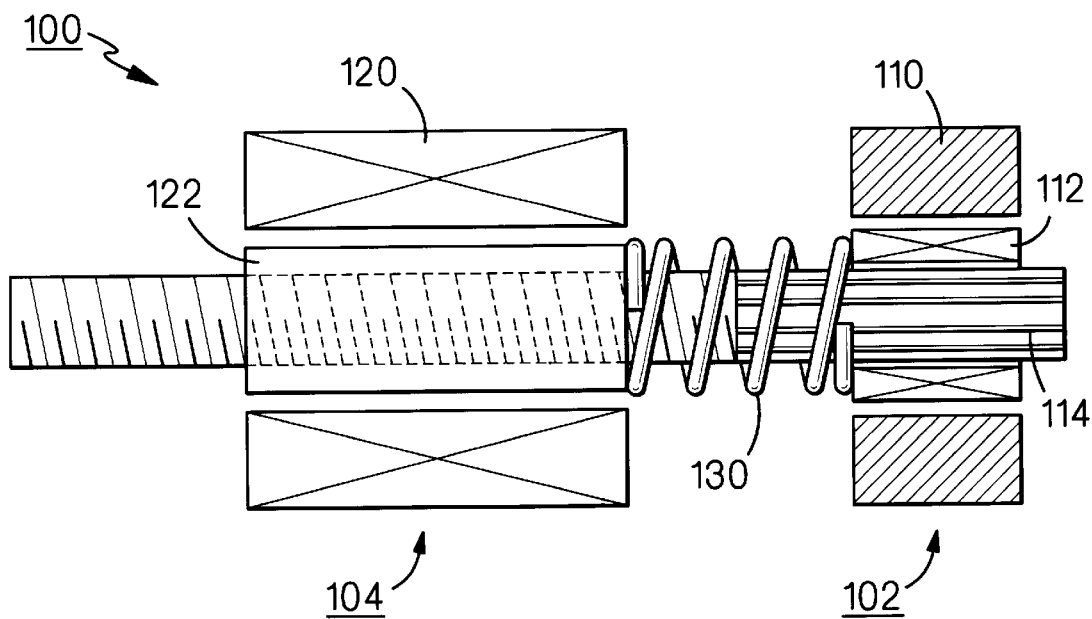
FIG. 3 is a side elevational view, partially in cross-section, of a combination linear actuator and solenoid to become a linearly adjustable solenoid.

FIG. 3 illustrates a combination linear actuator and solenoid, generally indicated by the reference numeral 100, the motor generally indicated by the reference numeral 102, and the solenoid generally indicated by the reference numeral 104. Motor 102 includes a stator 110 surrounding and electromagnetically engaging a rotor 112, the rotor having passing centrally therethrough a shaft 114, the portion of the shaft passing through the rotor being splined. The interior channel of rotor 112 through which shaft 114 passes has a shape complementary to that of the splined portion of the shaft, such that rotation of the rotor will cause the shaft to rotate. Solenoid 104 includes a coil 120 surrounding and electromagnetically engaging a core 122. A distinguishing feature of this embodiment is that the portion of shaft 114 not passing through rotor 112 is threaded and passes centrally through a complementarily threaded axial channel defined through core 122. The coil 120 have complementary splined surfaces, such that, when coil 120 and shaft 114 are secured against relative radial motion (by means not shown), there will be relative axial motion between solenoid 104 and shaft 114 as the shaft rotates. A spring 130 is provided to return core 122 to its neutral position when solenoid 104 is de-energized.

In the embodiments of the present invention described above, it will be recognized that individual elements and/or features thereof are not necessarily limited to a particular embodiment but, where applicable, are interchangeable and can be used in any selected embodiment even though such may not be specifically shown.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. An actuator, comprising:

(a) a shaft;

(b) a solenoid, having a coil and a core, disposed at a first selected position on said shaft, with an external surface of said shaft and an internal surface of said core having complementarily engaging surfaces such that rotation of said shaft will cause said core to move axially; and (c) a rotary motor, having a stator and a rotor, disposed at a second selected position on said shaft, with said shaft passing through said rotor, an external surface of said shaft and an internal surface of said rotor having complementarily engaging surfaces such that rotation of said rotor will cause rotation of said shaft and axial motion of said shaft will be isolated from said rotor.

2. An actuator, as defined in claim 1, further comprising: a spring disposed so as to cause said core to return to a neutral position when said coil is de-energized.

3. An actuator, as defined in claim 1, wherein: said shaft terminates within said core.

4. An actuator, as defined in claim 1, wherein: said shaft extends from both ends of said core.

5. An actuator, as defined in claim 1, wherein: said first position may be changed by repositioning said core on said shaft.

6. An actuator, as define in claim 1, wherein: said first position may be changed by rotating said core on said shaft.

* * * * *